United States Patent [19]
Chow

[11] Patent Number: 5,392,525
[45] Date of Patent: Feb. 28, 1995

[54] DRAWING INSTRUMENT

[76] Inventor: Tien-Jin Chow, No. 117, San Ting Lane, Shui Li Tsun, Shui Li Hsiang, Nan Tou Hsien, Taiwan, Prov. of China

[21] Appl. No.: 34,259

[22] Filed: Mar. 22, 1993

Related U.S. Application Data

[63] Continuation-in-part of Ser. No. 893,917, Jun. 4, 1992, abandoned.

[51] Int. Cl.6 .............................................. B43L 7/10
[52] U.S. Cl. ...................................... 33/465; 33/471; 33/496
[58] Field of Search ................ 33/465, 452, 468, 471, 33/473, 495, 496, 497

[56] References Cited

U.S. PATENT DOCUMENTS

| | | | |
|---|---|---|---|
| 691,728 | 1/1902 | Norfolk | 33/496 |
| 715,194 | 12/1902 | Callahan | 33/496 |
| 840,628 | 1/1907 | Johnson | 33/471 |
| 999,725 | 8/1911 | Adams | 33/496 |
| 1,159,569 | 11/1915 | Chancellor | 33/465 |
| 2,054,420 | 9/1936 | Hochman | 33/495 |
| 3,273,246 | 9/1966 | Siberini | 33/470 |
| 4,562,649 | 1/1986 | Ciavarella | 33/465 |
| 5,020,233 | 6/1991 | Syken | 33/465 |

Primary Examiner—Christopher W. Fulton
Attorney, Agent, or Firm—Head & Johnson

[57] ABSTRACT

A drawing instrument including two rulers each having a head portion, a circular protrusion formed on one of the head portions, and a circular recess formed in the other head portion for slidable engagement with the circular protrusion, the rulers are guided to rotate relative to each other by the slidable engagement between the circular protrusion and the circular recess. The head portions can be easily coupled together without additional tools or without additional coupling devices.

1 Claim, 9 Drawing Sheets

DRAWING INSTRUMENT

CROSS-REFERENCE TO RELATED APPLICATIONS

This is a continuation-in-part of application Ser. No. 07/893,917, filed Jun. 4, 1992, for "Drawing Instrument" now abandoned.

BACKGROUND OF THE INVENTION

1. Field of the Invention

The present invention relates to a drawing instrument, and more particularly to a drawing instrument suitable for drafting angular lines.

2. Description of the Prior Art

A typical drawing instrument is disclosed in U.K. Patent No. 738,223 and comprises an arm 2 having a circular portion 5 formed on one end thereof and rotatably engaged in a base 1. In this drawing instrument, the arm 2 is apt to be disengaged from the base 1, particularly during drafting operations, such that the user may feel inconvenient. In addition, when drafting two sides of an angle with the arm 2 and the top edge 4 of the base 1, the coupling portion of the sides of the angle will be obstructed by the circular portion 5, such that the drawing instrument should be removed before the angle can be completed. This is also inconvenient.

The present invention has arisen to mitigate and/or obviate the afore-described disadvantages of the contentional drawing instruments.

Another drawing instrument is disclosed in U.S. Pat. No. 715,194 to Callahan, issued Dec. 2, 1902, entitled "COMBINED RULE AND SQUARE". Such a ruler includes two rulers each having a head portion slidably coupled together such that the rulers are rotatable relative to each other. However, one of the head portions includes a single hinge part which is rotatably engaged between a pair of parallel hinge parts formed on the other head portion. Since the rulers are made thin, such that the pair of hinge parts should be made thinner and such that the hinge parts are apt to be broken. In addition, a pin should be engaged between the center of the pair of hinge parts and another pin is required to be provided in the radially outward portion of the pair of hinge parts for sliding engagement in a curved slot formed in the single hinge part; it is difficult to form the pins between the pair of hinge parts such that the manufacturing processes are complicated.

Another type of drawing instrument is shown in U.K. patent No. 1,134,676 to Bseso. Similarly, a bolt and nut is required for coupling the rulers together, in addition, the rotational angles of the rulers are limited such that the rulers may not rotate relative to each other for 180 degrees.

The present invention has arisen to mitigate and/or obviate the afore-described disadvantages of the conventional drawing instruments.

SUMMARY OF THE INVENTION

The primary objective of the present invention is to provide a drawing instruments with which angular lines can be easily and quickly drafted.

In accordance with one aspect of the invention, there is provided a drawing instrument comprising a first ruler including a first head portion formed on one end thereof, a second ruler including a second head portion formed on one end thereof, the first head portion and the second head portion each occupying at least three quarters of a circle, the first head portion including a circular protrusion formed thereon, the second head portion including a circular recess formed therein for slidable engagement with the circular protrusion of the first head portion, whereby, the first ruler is rotatable relative to the second ruler by the slidable engagement between the circular protrusion and the circular recess.

An alternate embodiment of the invention is a drawing instrument comprising a first ruler including a first head portion formed on one end thereof, a second ruler including a second head portion formed on one end thereof, the first head portion and the second head portion each occupying at least three quarters of a circle, the first head portion including a circular protrusion formed thereon, the second head portion including a circular recess formed therein for slidable engagement with the circular protrusion of the first head portion such that the rulers can be easily coupled together without additional tools or parts. The first ruler is rotatable relative to the second ruler by the slidable engagement between the circular protrusion and the circular recess.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
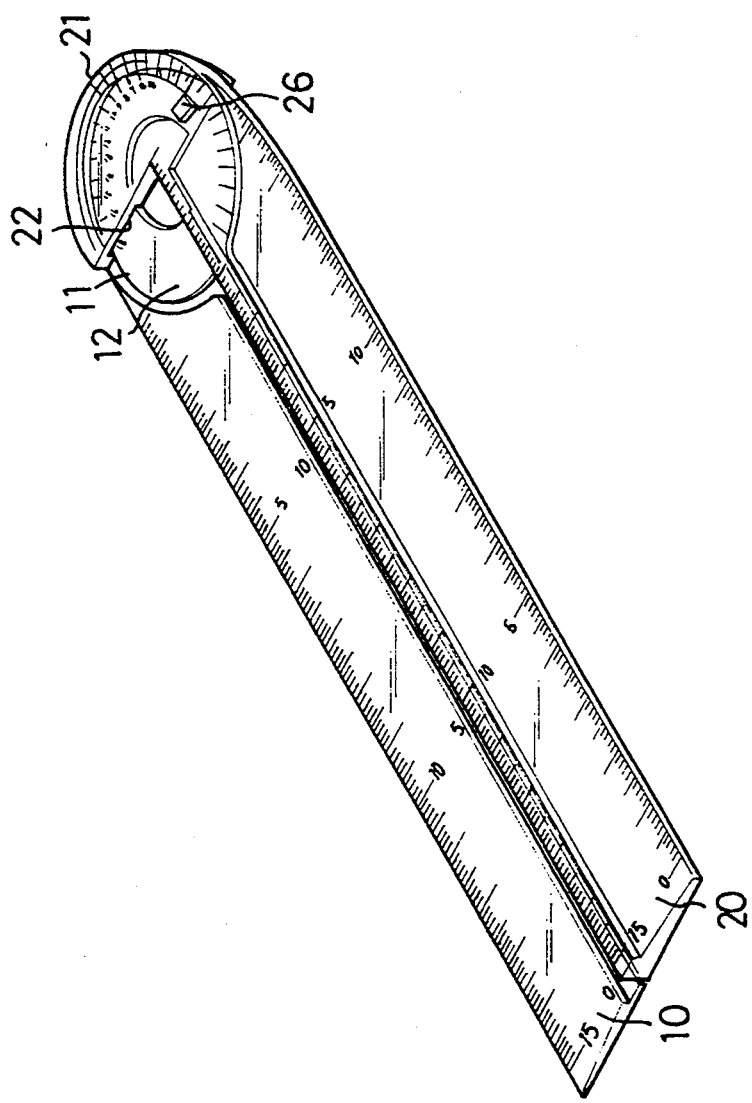
FIG. 1 is a perspective view of a drawing instrument in accordance with the present invention.
Figure 2:
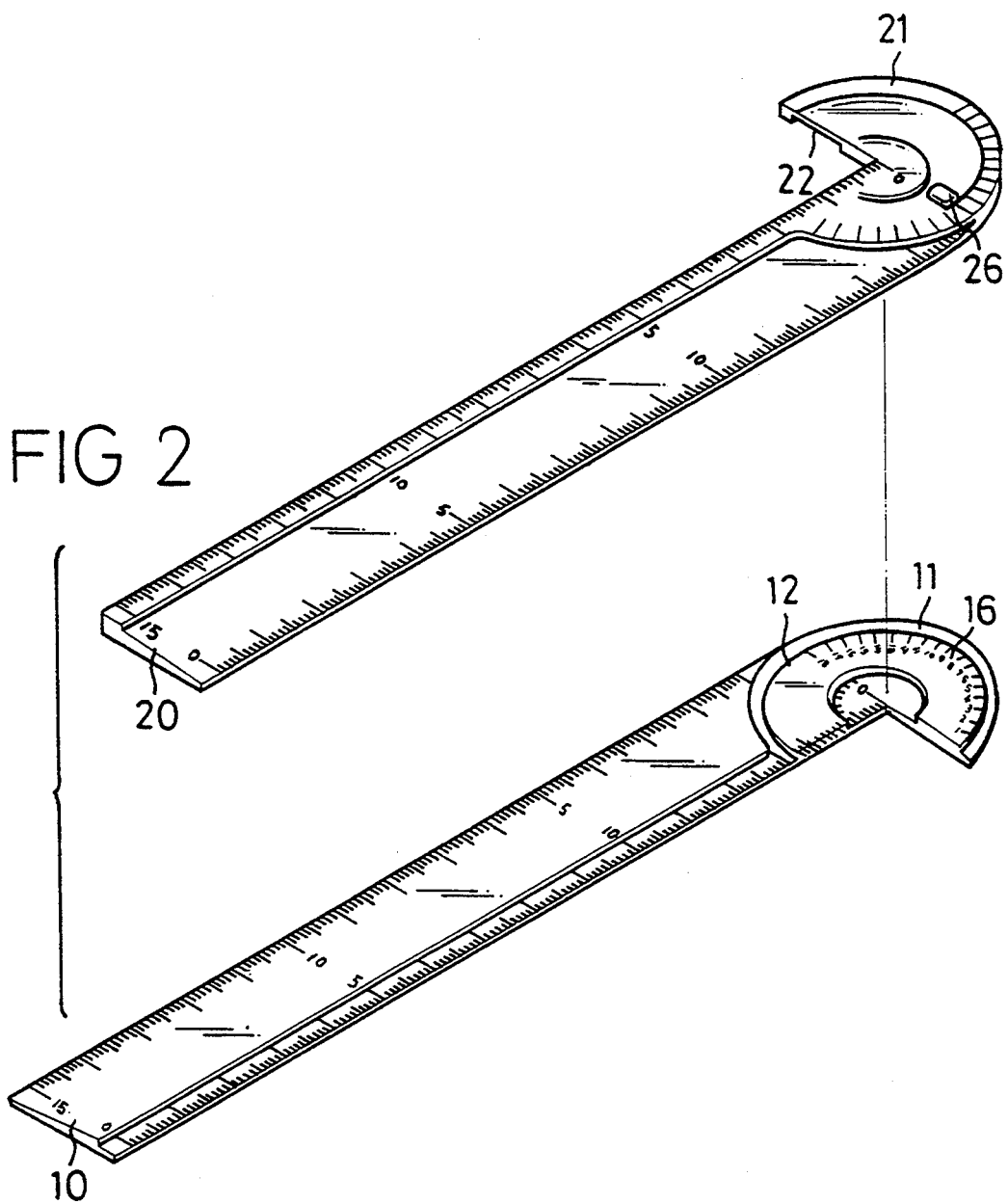
FIG. 2 is an exploded plane view of the drawing instrument.
Figure 3:
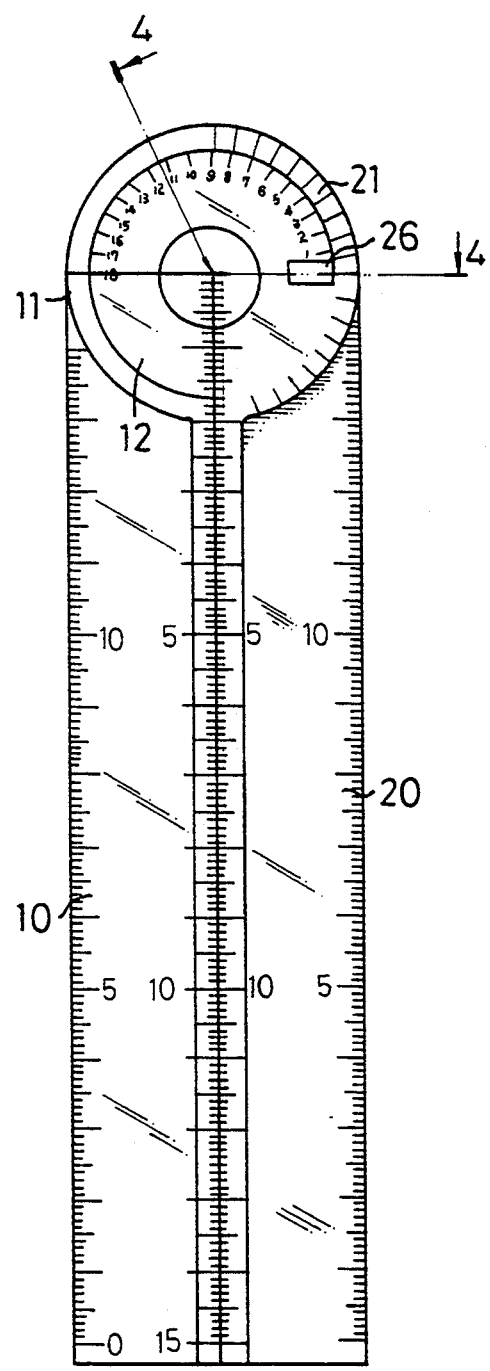
FIG. 3 is a top plane view of the drawing instrument.

Referring to the drawings, and initially to FIGS. 1 to 3, a drawing instrument in accordance with the present invention comprises generally two rulers 10, 20 each having a head portion 11, 21 formed on one end thereof, each of the head portions 11, 21 preferably occupies three quarters of a circle, in which one of the head portions 11 includes a circular protrusion 12 formed thereon, and the other of the head portions 21 has a circular recess 22 formed therein for engagement with the circular protrusion 12 such that the rulers 10, 20 are rotatable relative to each other by the slidable engagement between the circular protrusion 12 and the circular recess 22.

Figure 4:
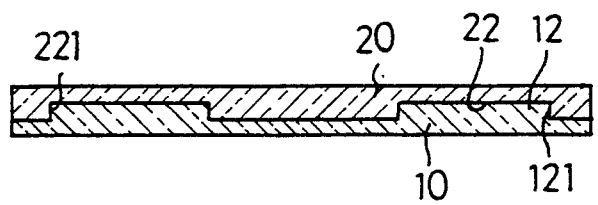
FIG. 4 is a cross-sectional view taken along line 4—4 of FIG. 3.

Each of the head portions 11, 21 includes a hole 14, 24 formed in the center thereof respectively such that the user can see through the center of the head portions 11, 21 and such that the center of the head portions 11, 21 can be aligned with any center point drawn in a surface, best shown in FIG. 3. A pin element, for example, as shown in the drawings, a bolt 15 is engaged in the head portion 11 of the first ruler 10, and the head portion 21 of the second ruler 20 includes an arcuate slot 25 formed therein for engagement with the bolt 15, such that the two rulers 10, 20 can further be coupled together without separating each from the other, as best shown in FIG. 4. An angular graduation 16 is formed in the head portion 11 of the first ruler 10, and the head portion 21 of the second ruler 20 includes a convex lens 26 formed thereon in order to enlarge the angular graduation 16. A pointer 28 is formed in the head portion 21 of the second ruler 20 for indicating a value of the angular graduation 16 corresponding to the relative rotational position between the two head portions 11, 21 of the rulers 10, 20.

Figure 5:
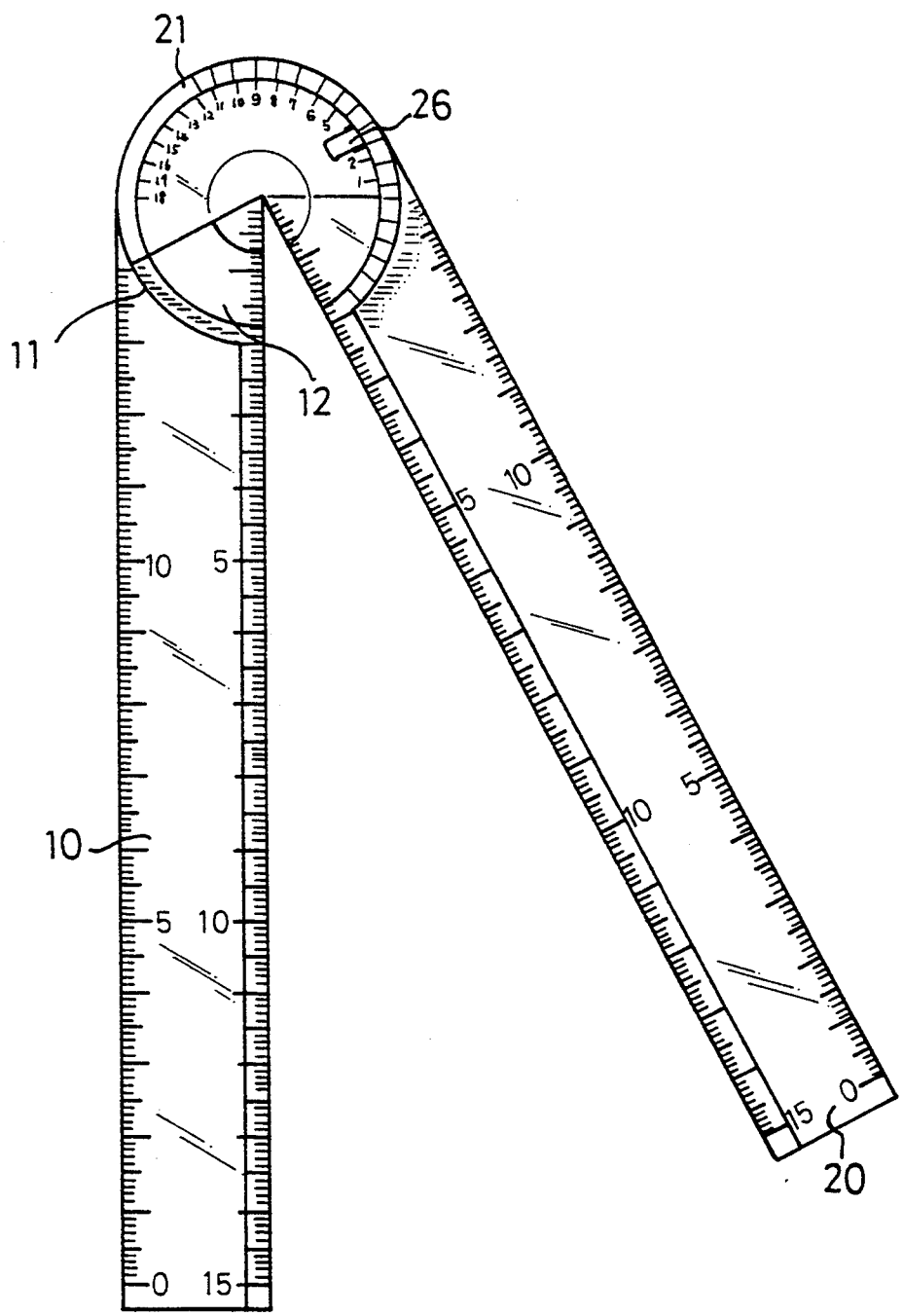
FIG. 5 is a schematic view illustrating the operation of the drawing instrument.

In operation, referring next to FIG. 5, the first ruler 10 is pressed against a surface to be drafted with lines and angles, the second ruler 20 can be rotated relative to the first ruler 10, for example, as shown in this drawing, the pointer 28 indicates "30" degrees, i.e., the second ruler 20 rotates 30 degrees relative to the first ruler 10, such that an angle with 30 degrees can be easily drafted. Similarly, any angle up to 180 degrees can be easily drafted. The angels can be easily drafted without removing the drawing instrument.

Figure 6:
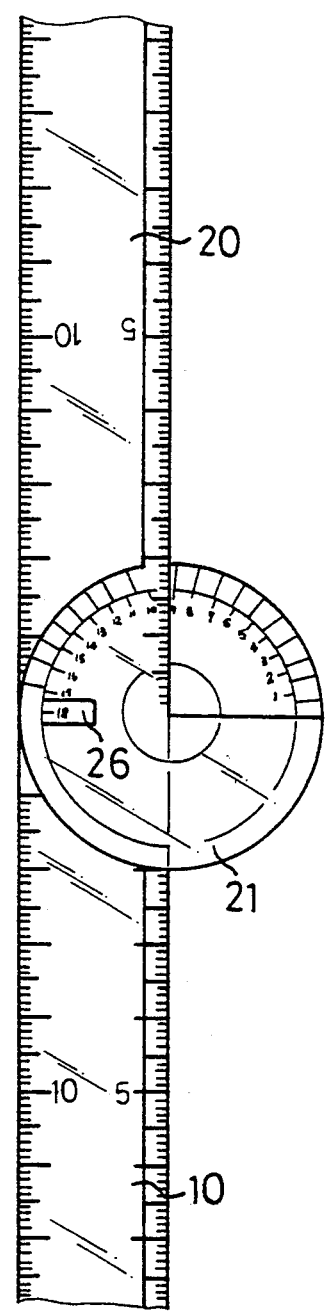
FIG. 6 is perspective view of an alternate embodiment of the drawing instrument.
Figure 7:
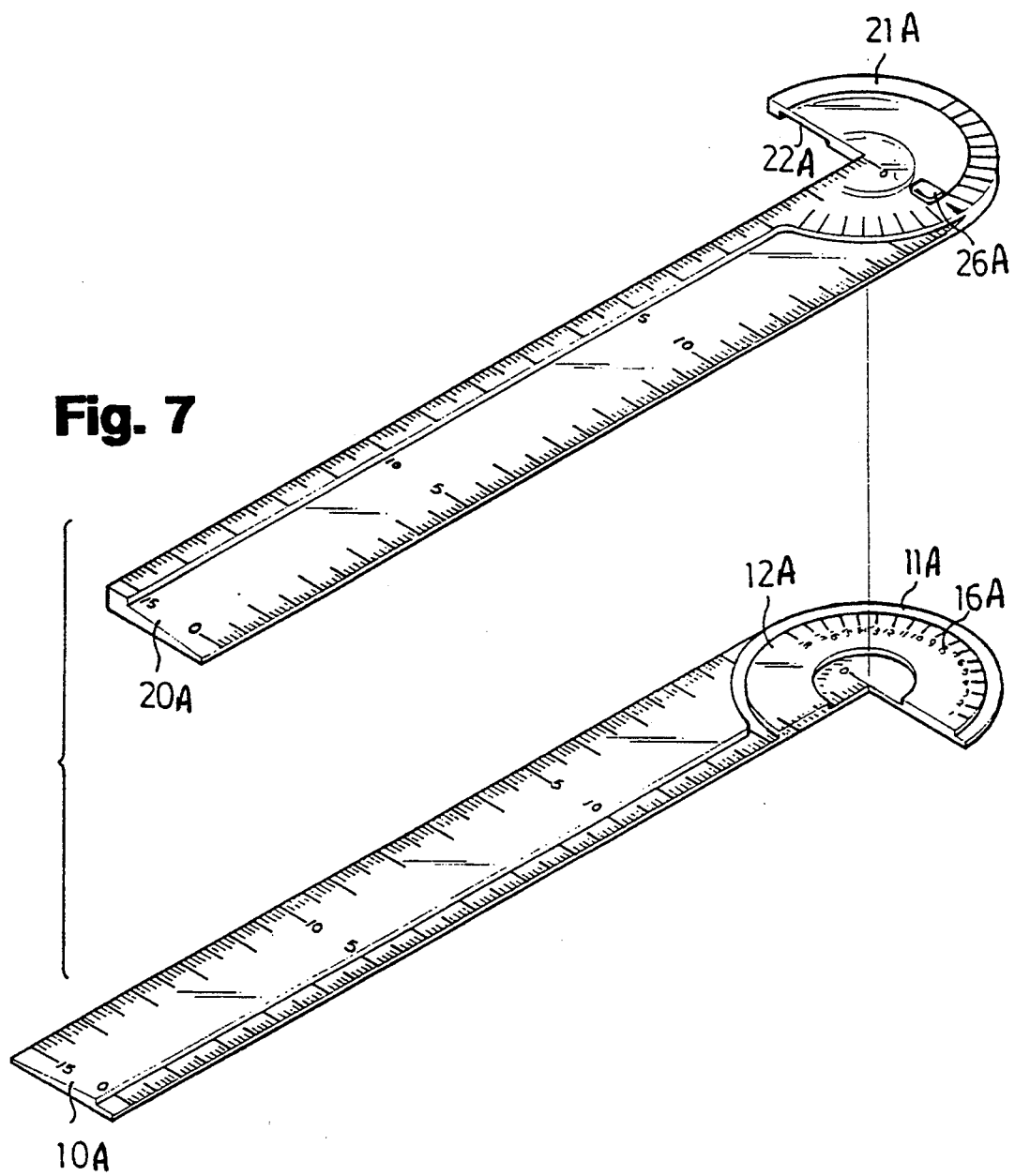
FIG. 7 is an exploded view of the alternate embodiment of the drawing instrument.
Figure 8:
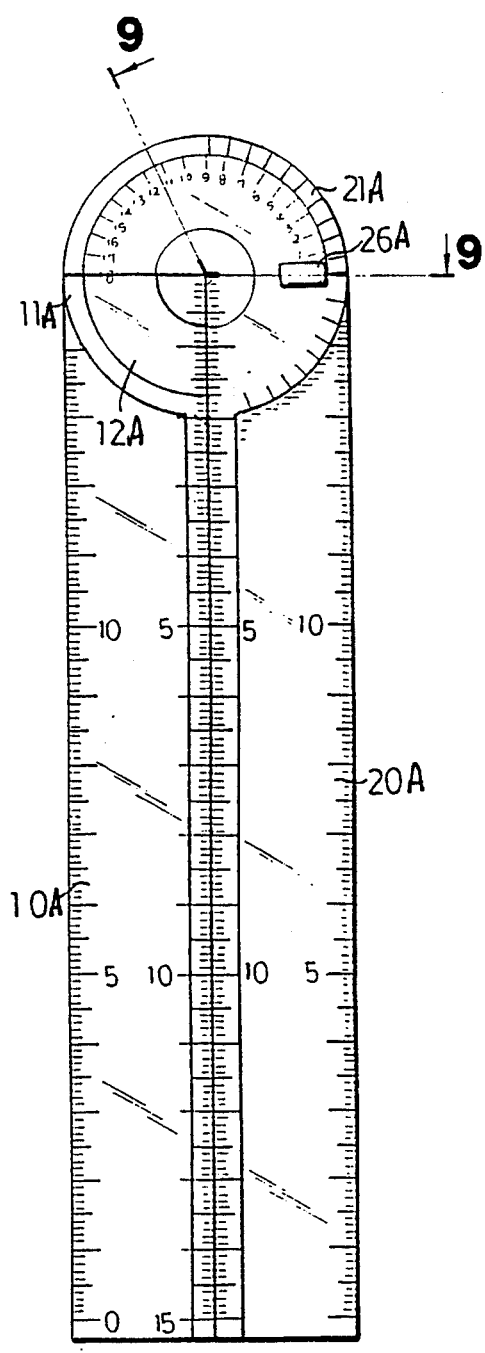
FIG. 8 is a top plane view of the alternate embodiment of the drawing instrument.
Figure 9:
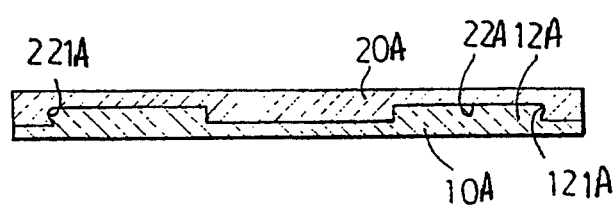
FIG. 9 is a cross-sectional view taken along line 9—9 of FIG. 8.

Referring now to FIGS. 6 through 8, an alternate embodiment of the present invention is illustrated comprised generally of two rulers 10A, 20A each having a head portion 11A, 21A formed on one end thereof, each of the head portions 11A, 21A preferably occupies three quarters of a circle, in which one of the head portions 11A includes a circular protrusion 12A formed thereon, and the other of the head portions 21A has a circular recess 22A formed therein for engagement with the circular protrusion 12A such that the rulers 10A, 20A are rotatable relative to each other by the slidable engagement between the circular protrusion 12A and the circular recess 22A. As best shown in FIG. 9, the circular protrusion 12A includes a radially inward surface and a radially outward surface, a rib 121A formed along the radially outward surface of the circular protrusion 12A; correspondingly, the circular recess 22A includes a radially inward surface and a radially outward surface, a depression 221A formed along the radially outward surface of the circular recess 22A for sliding engaging with the rib 121A, such that the head portions 11A, 21A can be easily coupled together by the engagement between the circular protrusion 12A and the circular recess 22A and such that the rulers 10A, 20A can be easily coupled together without additional tools or without additional pin elements or bolts.

An angular graduation 16A is formed in the head portion 11A of the first ruler 10A, and the head portion 21A of the second ruler 20A includes a convex lens 26A formed thereon in order to enlarge the angular graduation 16A.

Figure 10:
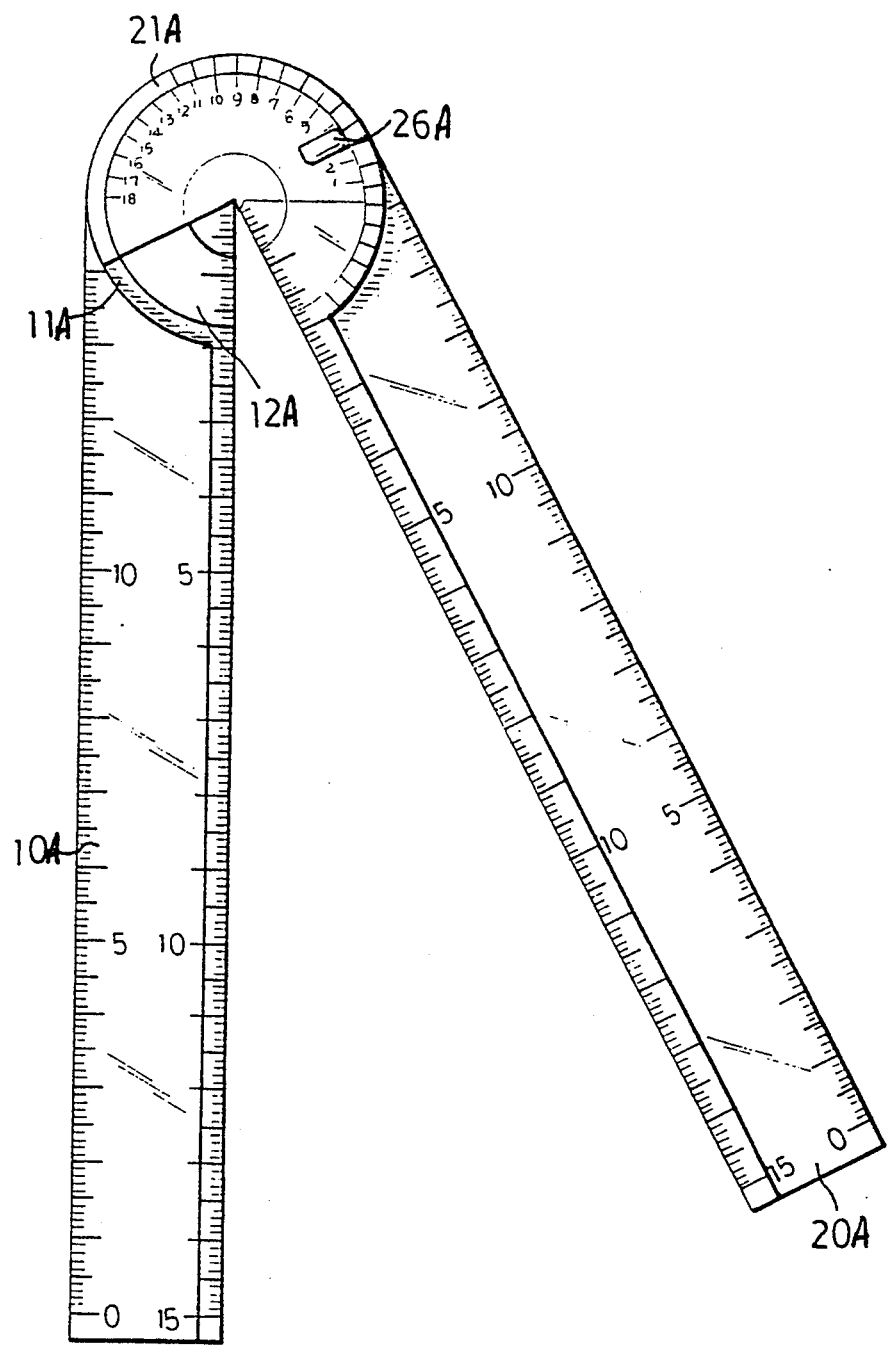
FIG. 10 is a schematic view illustrating the operation of the embodiment of the drawing instrument.
Figure 11:
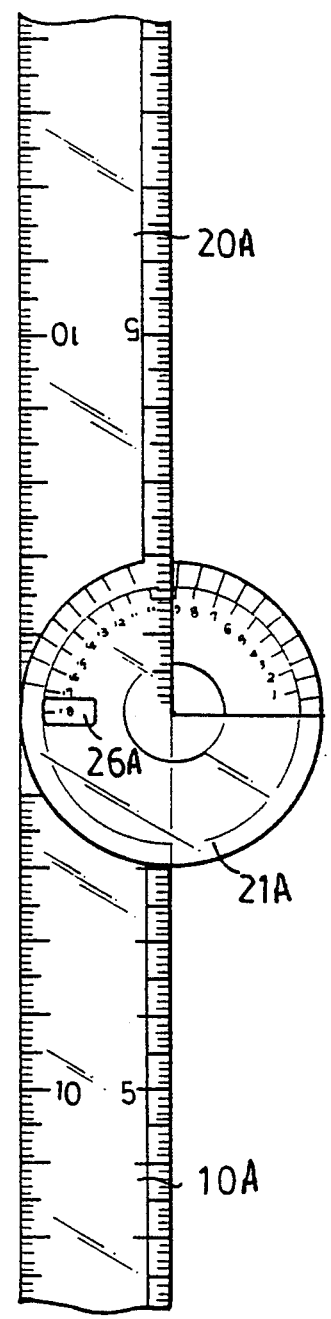
FIG. 11 is a schematic view of the alternate embodiment illustrating the fully opened position of one of the drawing instrument.

In operation, referring next to FIG. 10, the first ruler 10A is pressed against a surface to be drafted with lines and angles, the second ruler 20A can be rotated relative to the first ruler 10A, for example, as shown in this drawing, the numeral "30" is shown in the lens 26A, i.e., the second ruler 20A rotates 30 degrees relative to the first ruler 10A, such that an angle with 30 degrees can be easily drafted. Similarly, any angle up to 180 degrees can be easily drafted, as best shown in FIG. 11. The angles can be easily drafted without removing the drawing instrument.

Accordingly, any lines and angular lines can be easily and quickly drafted with the drawing instruments in accordance with the present invention. In the embodiment of FIGS. 6 through 11, the head portions 11A, 21A can be easily coupled together or press-fitted together by the engagement between the circular protrusion 12A and the circular recess 22A and the engagement between rib 121A and the depression 221A such that the rulers 10A, 20A can be easily coupled together without additional tools or without additional pin elements or bolts.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

what is claimed is:

1. A drawing instrument comprising a first ruler including a first head portion formed on one end thereof, a second ruler including a second head portion formed on one end thereof, said first head portion including an annular protrusion formed thereon having an outer and a concentric inner surface, said second head portion including an annular recess formed therein having an outer and a concentric inner surface rotatably receiving said annular protrusion of said first head portion, said first head portion and said second head portion forming a circle when said first head portion and said second head portion are engaged with each other, said first head portion and said second head portion each occupying at least three quarters of said circle, said first head portion including an angular graduation formed thereon, said second head portion including a convex lens formed thereon for enlarging said angular graduation of said first head portion, and said second head portion including a pointer formed thereon for indicating said angular graduation of said first head portion, said annular protrusion outer surface being frusto-conical forming a circumferential rib, said annular recess outer surface being frusto-conical forming a circumferential depression for rotatable engagement with said circumferential rib of said annular protrusion and for stably coupling said first head portion and said second head portion together, said second head portion annular recess inner surface rotatably receiving said first head portion annular protrusion inner surface whereby said first ruler is rotatable relative to said second ruler by said slidable engagement between said annular protrusion and said annular recess.

* * * * *